United States Patent [19]

Foscante et al.

[11] 4,250,074

[45] Feb. 10, 1981

[54] INTERPENETRATING POLYMER NETWORK COMPRISING EPOXY POLYMER AND POLYSILOXANE

[75] Inventors: Raymond E. Foscante, Yorba Linda; Albert P. Gysegem, Monrovia; Pamela J. Martinich, Long Beach; Gabriel H. Law, Rancho Palos Verdes, all of Calif.

[73] Assignee: Ameron, Inc., Monterey Park, Calif.

[21] Appl. No.: 72,897

[22] Filed: Sep. 6, 1979

Related U.S. Application Data

[63] Continuation-in-part of Ser. No. 953,920, Oct. 23, 1978, abandoned.

[51] Int. Cl.³ ............... C08G 77/26; C08L 63/00; C08L 83/06
[52] U.S. Cl. ............... 260/32.8 EP; 260/33.4 EP; 260/33.6 EP; 260/37 EP; 525/903; 528/27
[58] Field of Search ............... 528/27; 525/903; 260/32.8 EP, 33.4 EP, 33.6 EP, 37 EP

[56] References Cited

U.S. PATENT DOCUMENTS

| | | |
|---|---|---|
| 2,843,560 | 7/1958 | Mika . |
| 3,072,594 | 1/1963 | Shultz et al. |
| 3,131,161 | 4/1964 | Niezsche et al. . |
| 3,247,280 | 4/1966 | Kanner ............... 260/824 |
| 3,455,877 | 7/1969 | Plueddemann ............... 260/46.5 |
| 3,496,139 | 2/1970 | Markovitz ............... 260/47 |
| 3,725,501 | 4/1973 | Hilbelink et al. ............... 260/824 R |
| 3,868,342 | 2/1975 | Magne ............... 260/29.2 M |

*Primary Examiner*—Earl A. Nielsen
*Attorney, Agent, or Firm*—Christie, Parker & Hale

[57] ABSTRACT

Polymeric structures having interpenetrating matrices in cured form comprising an epoxy-polyamine network and a polysiloxane network. The interpenetrating network physical and chemical properties are improved over those of either polymeric component alone. The network can be prepared by simultaneously reacting epoxy resin having at least two oxirane groups with amine curing agent, and having present at least 0.1 equivalent of silane, water being substantially uniformly distributed throughout the mixture in an amount sufficient to bring about substantial hydrolytic polycondensation of the silane to form a cross-linked interpenetrating polymer network. The amine curing agent may be substituted wholly or in part by aminosilane. Sources of silane may include aminosilane and epoxysilane. Relative reaction rates of formation of the polymeric networks are controlled, to get good intertwining of the two polymers.

63 Claims, 4 Drawing Figures

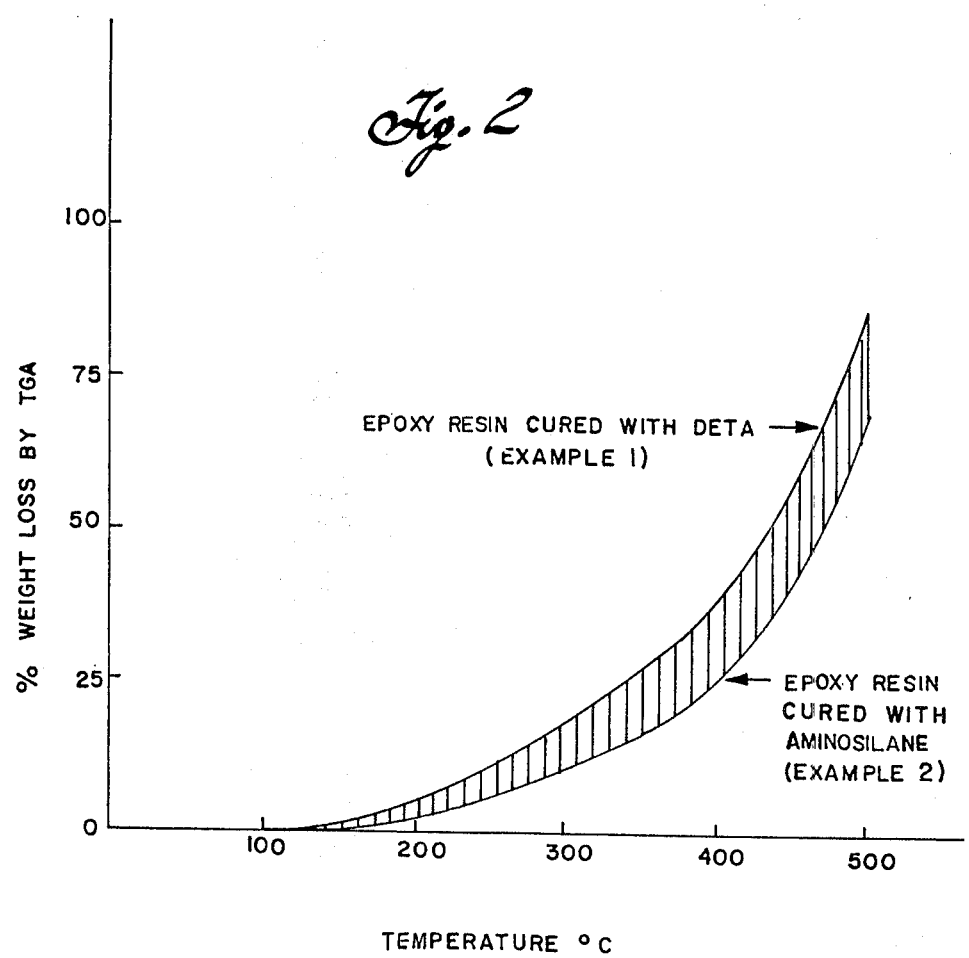

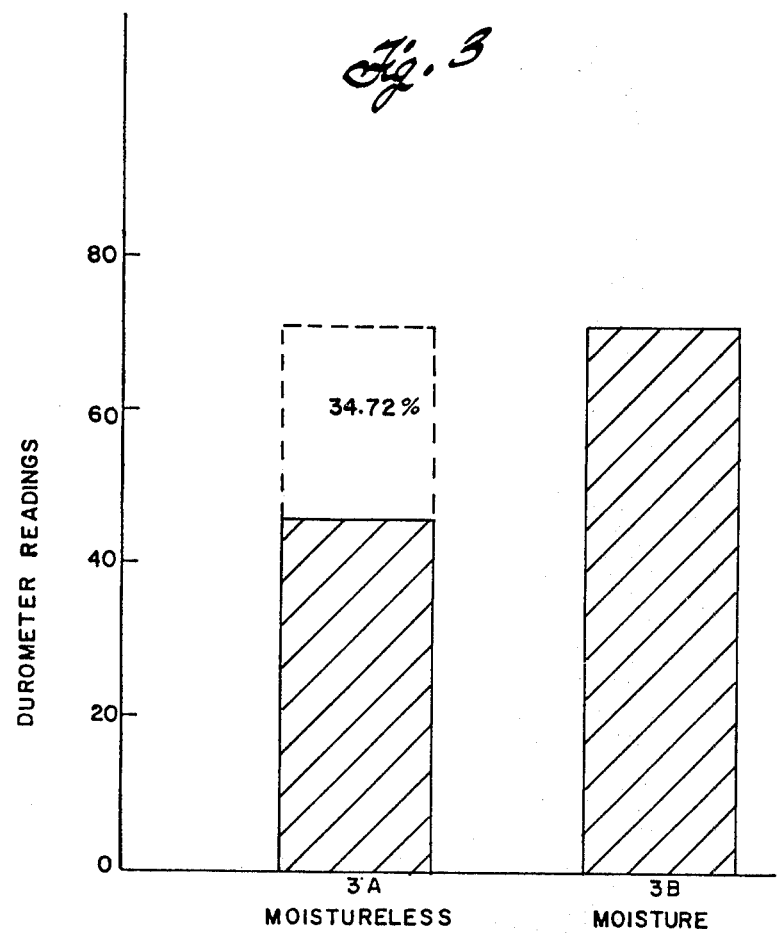

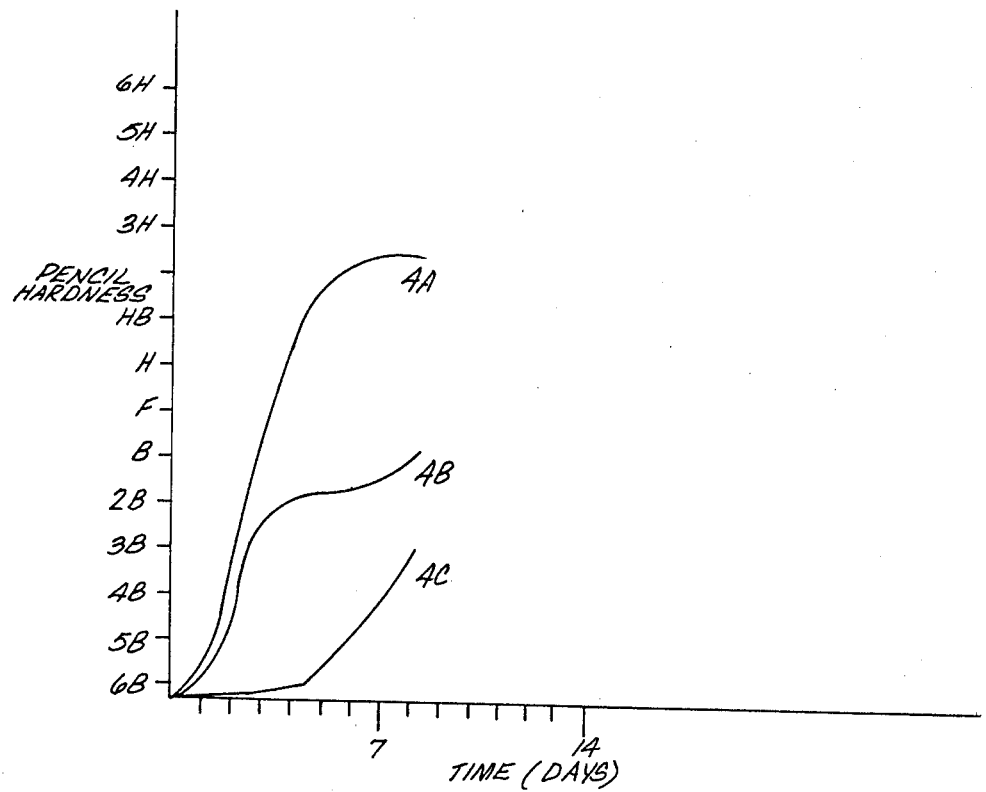

INTERPENETRATING POLYMER NETWORK COMPRISING EPOXY POLYMER AND POLYSILOXANE

CROSS-REFERENCE TO RELATED APPLICATIONS

This application is a continuation-in-part of copending U.S. Ser. No. 953,920, filed on Oct. 23, 1978, now abandoned, and assigned to the same assignee as this invention.

BACKGROUND OF THE INVENTION

This application is directed to epoxy resin coatings of improved properties. Epoxy coatings possess many properties that make them desirable for use as a coating material, particularly as a coating material for steel. For example, they adhere well to steel, have good application properties and are readily available. Epoxy coatings also have good chemical resistance to many chemicals and solvents. However, the resistance of epoxy resins to attack by some solvents, such as acetone and methanol, can be poor. The properties of an epoxy resin film depend upon the chemical nature of the cure linkage, extent of cross-linking relative to chain extension, and cross-linked density. The most important commercial cure mechanisms use aliphatic amines, aromatic amines, and carboxylic derivatives. Unfortunately, the amines and carboxylic derivatives result in cured materials which are generally sensitive to acid or hydrolytic degradation. A structural basis for the susceptibility degradation, when using an amine curing agent, is the presence of the substituted nitrogen group in the matrix which can be protonated by acid and undergo a series of degradation reactions. In the case of cure with carboxylic acid derivative, an ester linkage results. Ester groups are subject to hydrolysis catalyzed by both acid and base.

In summary, acid and hydrolytic resistance is a problem experienced in the use of epoxy resins.

SUMMARY OF THE INVENTION

The present invention provides coatings of modified epoxy polymers with improved solvent, acid, and base resistance by forming an interpenetrating polymer network (IPN) of a polymerized epoxy resin network intertwined with a polysiloxane network formed by the hydrolytic polycondensation of silane groups. This is achieved by the simultaneous polymerization, at substantially balanced reaction rates, of a mixture of epoxy resin and silane groups to form the two intertwined networks extending throughout the coating. An amine curing agent forms the epoxy network, and water distributed throughout the mixture causes the hydrolytic polycondensation of the silane groups.

A preferred method for preparing the IPN is to react epoxy resin with an aminosilane capable of both hydrolytic polycondensation of the silane moiety and amine addition of the oxirane rings of the epoxy resin. The epoxy resin has at least two oxirane groups. The aminosilane curing agent contributes at least 0.1 equivalent of amine per 1 oxirane equivalent, and has the general formula:

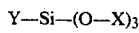

Y—Si—(O—X)$_3$ where each X is independently selected from the group consisting of alkyl, hydroxyalkyl, alkoxyalkyl, and hydroxyalkoxyalkyl radicals containing less than six carbon atoms, and where Y is H[HNR$\frac{}{}$]$_a$, where a is an integer from 2 to about 6. Each R is a difunctional radical independently selected from the group consisting of alkyl, aryl, dialkylaryl, alkoxyalkyl and cycloalkyl radicals, and R can vary within a Y. Preferably, Y is H[HN(CH$_2$)$_b$$\frac{}{}$]$_a$, where a is an integer from 1 to about 10, and b is an integer from 1 to about 6.

To produce an IPN in accordance with this invention, the cure rates of the epoxy resin and silane groups must be relatively balanced. If either group cures too fast relative to the other, "domaining" occurs, causing unacceptable discontinuities in the final coating. Thus, the chemical and physical properties of the final IPN are strongly affected by the relative rates of epoxy resin curing and hydrolytic polycondensation of the silane. Since polysiloxane formation requires water, the epoxy polymerization would predominate if water were not substantially uniformly distributed throughout the mixture as the epoxy curing begins. Accordingly, in the presently preferred form of the invention, the mixture of the epoxy resin, amino curing agent, and silane groups includes agents with a good affinity for water, such as amines, aldehydes, alcohols, ethers, and ketones having less than about nine carbon atoms, and which are miscible with the unpolymerized epoxy and silane compounds. In general, compounds with suitable affinity for water contain from one to about eight carbon atoms and ether, carbonyl, oxygen-hydrogen, or nitrogen-hydrogen linkages.

The selection of solvents affects the relative rates of reaction. Hydrocarbon solvents, which have no affinity for water, have little effect beyond increasing monomer mobility and reducing the monomer concentration. Alcohol solvents best catalyze the epoxy-amine reaction, but also absorb water from the atmosphere to facilitate the distribution and availability of water for condensation of silane groups.

A more complex situation arises when ketone solvents are used. Ketones react reversibly with primary amines to form ketimines and water. In the presence of hydrolyzable silanes, the water so formed irreversibly reacts to hydrolytically polycondense the silane groups. The ketimine formed will not react with the oxirane groups of the epoxy resins or of epoxysilanes, and remains in the ketimine form until additional water is available to reverse the reaction. This water can be added initially or be absorbed from the environment. Since only primary amines react to form ketimines, any secondary amine group present, either on the aminosilane or other amine curing agent, reacts with the oxirane groups. However, without the availability of the primary amines, the rate of the epoxy-amine reaction is slowed overall and limited by moisture absorption from the environment. Since the hydrolysis of the silane by the water from ketimine formation accelerates the formation of the polysiloxane portion of the IPN, judicious choice of solvents or no solvent permits the relative polymerization rates of the epoxy and silane groups to be balanced to form IPNs with solvent resistance superior to that of other epoxy base coatings.

Other factors influence the relative rates for the epoxy curing and the polysiloxane formation. For example, in a neutral pH, hydrolytic polycondensation of the silane groups proceeds so slowly as to be unusable in most applications. In acidic or basic media, however, the reaction proceeds more rapidly. In the preferred methods for forming the IPN of this invention, at least one of the epoxy curing agents contains amine functionality. This makes the system basic and facilitates the hydrolysis and polycondensation of the silane. In the case of aminosilane, the juxtaposition of the catalytic amine portion of the molecule and the hydrolyzable silane portion of the molecule produces an efficient self-catalytic silane. Epoxy catalysts, such as alcohols, phenols, and tertiary amines, preferentially accelerate the epoxy curing reactions.

The epoxy curing reaction rates increase with temperature. The rate of hydrolytic polycondensation of silane groups changes little with temperature. However, increased temperature facilitates diffusion and evaporation of the alcohol formed, thereby increasing the rate of hydrolytic polycondensation.

Another preferred method for preparing the IPN of this invention is to use an epoxy functional silane in combination with the epoxy resin, and cure the mixture with conventional curing agents, such as polyamines. Epoxy polymer formation in this method includes both the reaction between the epoxy resin and the amine and the reaction of the epoxysilane with the amine. In the latter case, the epoxysilane-amine reaction product is essentially the same as the epoxy-aminosilane of the above method. The relative reaction rates in the final IPN are essentially identical to that of the method utilizing aminosilane as the source of silane. In this second preferred method, the epoxy resin comprises up to about 80 molar percent of epoxy resin having at least two oxirane groups, and at least 20 molar percent of at least one epoxysilane of the formula:

Z—Si—(O—X)$_3$ where X is defined as above and where Z is an alkyl or oxyalkyl containing from 2 to about 8 carbon atoms and at least one oxirane group.

The source of silane may be any of the well known polysilicates, aminosiloxane, epoxysilane, any combination thereof, or any other suitable source. The epoxy resin may be cured by ordinary amine curing agents, aminosilane, or combinations of ordinary curing agents and aminosilane.

Fillers may also be used to balance the cure rates of the epoxy and silane groups. A filler may act as a carrier of water to facilitate the curing of silane groups, and to provide an escape for the alcohol formed as the silane groups condense. Examples of useful fillers are talc (magnesium silicate), silicate powder, alumina, carbon black, china clay (aluminum silicate), steel chips, magnesium zinc dust for corrosion resistance of steel surfaces, steel filings, aluminum flake, calcium carbonate, thixotropic agents, Wollastonite (calcium silicate), fibrous fillers (such as asbestos and chopped glass), barytes (barium sulfate), barium metaborate, and various other fillers commonly employed in combination with epoxy resins.

BRIEF DESCRIPTION OF THE DRAWINGS

FIG. 2 graphically compares percentage weight loss upon heating of an epoxy resin cured with aliphatic amine versus the same epoxy resin cured with aminosilane in accordance with the present invention;

FIG. 3 graphically compares the hardness of a thin film of epoxy resin dissolved in a ketone and cured with aminosilane in the presence of atmospheric moisture and in the absence of atmospheric moisture;

FIG. 4 graphically compares the solvent effects on the simultaneous reactions occurring during IPN formation in a film.

DETAILED DESCRIPTION OF THE INVENTION

Figure 1:
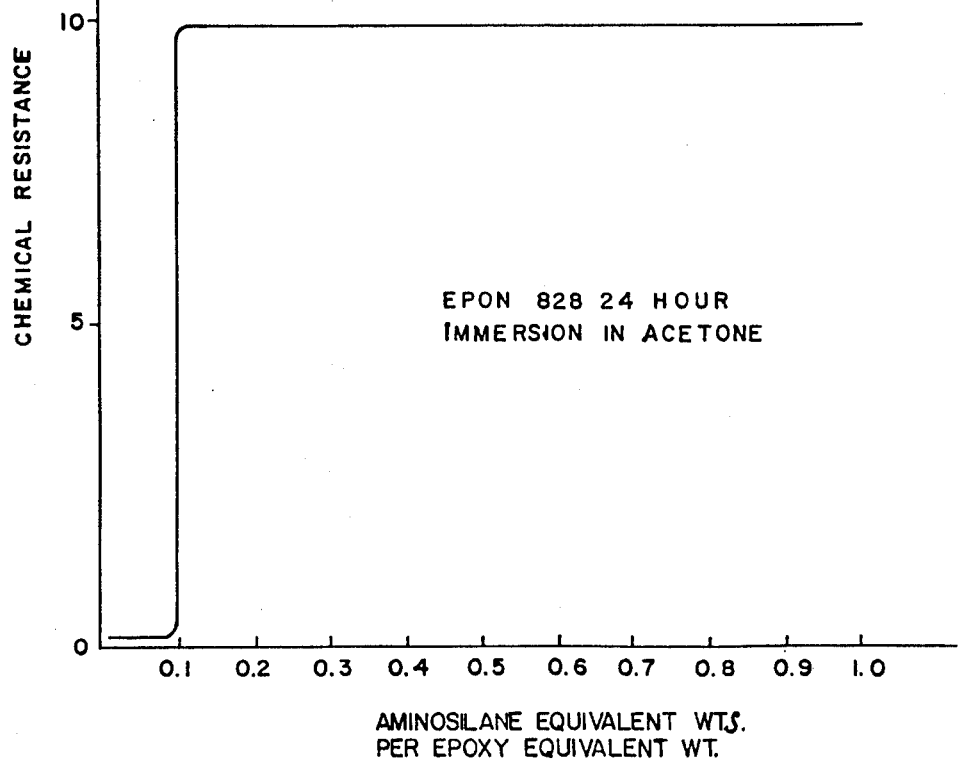
FIG. 1 graphically compares solvent resistance of the epoxy resin cured with aminosilane and aliphatic amine as a function of aminosilane equivalents used.

The present invention provides unique polymeric structures having interpenetrating matrices in cured form. These interpenetrating polymeric matrices are comprised of intertwined epoxy-polyamine and polysiloxane networks. The resulting structure has physical and chemical properties much improved over those of either polymeric component alone. Interpenetrating networks are described in some detail by C. H. Sperling, "Application of Group Theory Concepts to Polymer Blends, Grafts, and IPN's", Advances in Chemistry, Series No. 154, American Chemical Society, Washington, D.C., 1976, pp. 159–178.

Three methods are described herein for producing the interpenetrating network of epoxy polymer and polysiloxane. The first method involves the substantially simultaneous curing of an epoxy resin mixed with a silane, and the hydrolytic polycondensation of the silane with water substantially uniformly distributed throughout the mixture. The substantially simultaneous reactions form intertwined epoxy-polyamine and polysiloxane networks. The second method involves substitution of an aminosilane for all or part of the amine curing agent. The third method involves the substitution of an aminosilane or an epoxysilane as sources of the silane in the invention. These three methods are described in detail below.

The epoxy resin suitable for use in the present invention has at least two oxirane groups, i.e., at least two

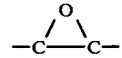

groups. Polyepoxides which can be used in the present invention are described in U.S. Pat. No. 3,183,198 to Wagner, in column 3, line 27 through column 4, line 64. This portion of U.S. Pat. No. 3,183,198 is incorporated herein by reference. The epoxy resin used can also contain some monomer units having only one oxirane group. However, only a small portion of these can be tolerated without adversely affecting the properties of the product interpenetrating network. A blend of different monomer types can also be used.

The first method for the preparation of the interpenetrating network involves the substantially simultaneous steps of curing an epoxy resin and effecting hydrolytic polycondensation of silane groups. The epoxy resin has at least two oxirane groups per molecule, and is reacted with an amine curing agent of the general formula:

H(HNR)$_a$NH$_2$ where a is an integer from one to about six, each R is a difunctional radical independently selected from a group consisting of alkyl, aryl, dialkylaryl, alkoxyalkyl, and cycloalkyl radicals, and R may vary within the amine curing agent. The silane is mixed with the epoxy resin and is selected from the group consisting of alkoxysilane, alkyltrialkoxysilane, aryltrialkoxysilane, and hydrolytic polycondensation products thereof. Water is substantially uniformly distributed throughout the mixture of epoxy, epoxy curing agent, and silane in an amount sufficient to bring about substantial hydrolytic polycondensation of the silane to form intertwined epoxy-polyamine and polysiloxane networks.

In the second method of producing the interpenetrating polymer network, an aminosilane is substituted for all or part of the requisite amine curing agent of the general formula above. The general formula of the group of permissible aminosilanes is:

$$Y-Si-(O-X)_3$$

where Y is $H[HNR]_a$, where a is an integer from two to about six, each R is a difunctional organic radical independently selected from the group consisting of alkyl, aryl, dialkylaryl, alkoxyalkyl, and cycloalkyl radicals, and R can vary within a Y.

Each X can be the same or different, and is limited to alkyl, hydroxyalkyl, alkoxyalkyl, and hydroxyalkoxyalkyl groups containing less than about six carbon atoms so that the alcohol analogue of X (X—OH) formed during hydrolysis of the silane has sufficient volatility to evaporate, thus allowing the film to cure. Generally, the higher the molecular weight of X, the lower the volatility of its alcohol analogue. Examples of the groups from which X can be selected are the methyl, ethyl, n-propyl, isopropyl, n-butyl, isobutyl, hydroxymethyl, hydroxypropyl, methyloxymethyl, methyloxyethyl, hydroxyethyloxyethyl, and the like. Preferably, X is selected from the methyl or ethyl groups when rapid curing of a coating is desired. However, under certain conditions, such as coating interior surfaces under high temperature operating conditions, when low volatility is required, X can be a higher molecular weight group, such as methoxyethyl or ethoxyethyl.

Table 1 presents examples of aminosilanes which can be used for curing epoxy resins in accordance with the present invention to form an IPN comprising epoxy polymer and polysiloxane.

scribed herein cure at ambient and room temperatures without the use of such catalysts and accelerators. Preferably, only aminosilane curing agent is used to maximize cross-link density and optimize physical and mechanical properties of the cured film.

In the third method of producing the interpenetrating networks, aminosilanes or epoxysilanes are the source of all or part of the silane required to produce the interpenetrating network. The general formula of the permissible group of aminosilanes is set out above. The general formula for the permissible group of epoxysilanes is:

$$Z-Si-(O-X)_3$$

where Z is an alkyl or oxyalkyl group containing from two to about eight carbon atoms and at least one oxirane group, and where X is defined as above. According to the invention, the total requirement of silane may be satisfied by an aminosilane, epoxysilane, or a silane selected from the group specified in the first method above. Furthermore, a combination of any or all of these silanes, epoxysilane, and aminosilane may be utilized in this invention. In a preferred method, an epoxysilane of the above general formula comprises at least 20 molar percent of the total epoxy resin.

We have found that at least 0.1 equivalent weight of silane per epoxy resin equivalent weight must be used to achieve IPN formation. If less than 0.1 is used, the silane is not present in sufficient amount to form the siloxane network needed in the IPN of this invention.

The need for at least 0.1 equivalent weight of silane for each equivalent weight of epoxy resin is demonstrated by chemical resistance tests, the results of which are presented in FIG. 1. In these tests, EPON 828 was cured with about one amine equivalent weight of curing agent per one epoxy resin equivalent weight to form films having a final thickness of about 0.01". Amine equivalent weight as defined here is the number of grams of amine per active or acidic hydrogen. Epoxide equivalent weight is defined here as the number of

TABLE 1

| STRUCTURE | Aminosilanes Name | COMMERICAL NAME |
|---|---|---|
| $NH_2(CH_2)_3Si(OC_2H_5)_3$ | 3-Aminopropyl-triethoxysilane | A-1100 Union Carbide |
| $NH_2(CH_2)_3Si(OCH_3)_3$ | 3-Aminopropyl-trimethoxysilane | A-1100 Union Carbide |
| $NH_2(CH_2)_2NH(CH_2)_2NH-(CH_2)_2NH(CH_2)_3Si(OMe)_3$ | N-(N-(N-(2-aminoethyl)-2-aminoethyl)-2-aminoethyl)-3-aminopropyltrimethoxysilane | Not commerically available |
| 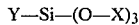 NH(CH$_2$)$_3$Si(OMe)$_3$ | N-(3-aminophenyl)-3-aminopropyltrimethoxysilane | Not commerically available |
| 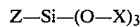 | N-(3-aminomethylphenylmethyl)-3-aminopropyltrimethoxysilane | Not commerically available |
| $H_2N(CH_2)_2NH(CH_2)_3Si(OCH_3)_3$ | N-(2-aminoethyl)-3-aminopropyltrimethoxysilane | A-1120 Union Carbide |

In addition to the aminosilanes, other conventional curing agents, such as aliphatic amines, mercaptans, and the like, can be used for curing epoxy resin. Likewise, if acceleration is required, accelerators or catalysts, such as alcohols, phenols, and the like, can be used. However, use of such catalysts and accelerators is not necessary, because it is found that IPN's prepared as degrams of epoxy resin per oxirane group. Silane equivalent weight is defined as the number of grams of silane per silicon atom which can or has undergone hydrolytic condensation with another silicon atom. EPON 828 is Shell Chemical Corporation's trademark for a normally liquid glycidyl polyether of bisphenol A, having an equivalent weight of 185 to 195, and a viscosity of 5,000 to 15,000 centipoises. The amine curing agent contained from 0 to 1.0 amine equivalent weight of A-1120 aminosilane curing agent per one epoxy resin equivalent weight, and included sufficient aliphatic amine curative (diethylene triamine) so the total curing agent equalled one amine equivalent weight per epoxy resin equivalent weight. The mixture also included 7.0 grams of china clay filler for each 18.5 grams of EPON 828 to prevent domaining. Various formulations of filler, epoxy resin, and curing agent were cured at ambient temperature in the presence of atmospheric moisture. The films so formed were then immersed in acetone at 50° C. for 24 hours, and rated in accordance with the chemical resistance scale presented in FIG. 1. The results presented in FIG. 1 clearly show that there is a significant discontinuity in the curve where the epoxy resin is cured with 0.1 aminosilane equivalent weight per epoxy resin equivalent weight. From this, it can be concluded that at least 0.1 equivalent weight of silane per epoxy resin equivalent weight is required so that there are sufficient $-Si-[O-X]_3$ groups to permit the formation of a polysiloxane network. Below this critical level, it is believed that polycondensation cannot take place to the extent sufficient to form the IPN of this invention. The results also show that a good IPN in accordance with this invention can be formed by absorbing moisture from the air if the applied film is thin enough and includes an agent with good affinity for water, such as the amine curing agent.

In all methods of preparing the interpenetrating polymer network, the proportion of amine curing agent to epoxy resin can vary widely whether the amine is of the general formula above, or an aminosilane or any combination thereof. In general, the epoxy resin is cured with sufficient amine and aminosilane curing agent to provide from about 0.5 to about 1.2 amine equivalent weight per epoxide equivalent weight, and preferably the ratio is about 1:1.

It is sometimes desirable to add a filler to the IPN's prepared according to the above methods. The filler is usually required to prevent domaining when the epoxy resin has a relatively low molecular weight, such as in the case with EPON 828. Among the fillers useful in the practice of this invention are talc (magnesium silicate), silicate powder, alumina, carbon black, china clay (aluminum silicate), steel chips, magnesium zinc dust for corrosion resistance of steel surfaces, steel filings, aluminum flake, calcium carbonate, thixotropic agents, Wollastonite (calcium silicate), fibrous fillers (such as asbestos and chopped glass), barytes (barium sulfate), barium metaborate, and various other fillers commonly employed in combination with epoxy resins. Pigments such as iron oxide, titanium dioxide, and chrome green can also be used. Organic pigments, such as hansa yellow, phthalo green, and phthalo blue may also be used to color the product.

When a coating exhibiting resistance to high temperatures is desired, a finely divided particulate pigment or filler can be used. Examples of fillers providing high heat resistance are barytes (barium sulfate), mica, micaceous iron oxide, aluminum flake, glass flake, stainless steel flake, and the like. By a proper selection of the binder and filler, heat-stable coatings resistant to temperatures around 300° C. can be achieved.

Pigment volume concentrations (PVC) of from about 20 to about 50 percent result in a coating with satisfactory mechanical properties. Pigment volume concentration is the volume of filler divided by the volume of filler plus the volume of resin used for making the coating. The exact PVC will depend upon the type of filler used, its density, desired solvent, acid and base resistance properties, etc.

The use of such fillers is desirable for balancing the cure rates of the epoxy resin and the cure rates of the silane groups. If either the epoxy resin or the silane groups cure too fast, visible domaining can occur where little, if any, interpenetration of polymer networks occurs. Visible domains are defined here as discontinuities in a coating which are visible to the naked eye. When such domaining occurs, lower solvent resistance is realized. The use of fillers facilitates diffusion of the X—OH groups formed by the hydrolysis of the silane groups and release of the X—OH groups to the atmosphere. The fillers can also carry adsorbed water, and thus supply water throughout the mixture as needed for silane polymerization to produce proper intertwining of the two networks.

Coating compositions prepared containing the IPN's of this invention can be applied to a surface to be treated by conventional techniques such as spraying or brushing. If desired, the applied coating can be heated or exposed in the form of a spray or thin film to a source of moisture for rapid curing, say, when a ketone solvent is used to react with the amine curing agent to produce temporarily a ketimine and water, which causes condensation of silane groups. When such mixture is applied as a fine spray to produce a thin coating, a humid atmosphere can supply the moisture needed to produce the primary amine curing group from the ketimine. The coating can be applied to new construction and over inorganic primers, including those containing anti-corrosion pigments, such as metallic zinc.

The components of the coating of this invention are supplied in a two-package system. One package contains the amine curing agent, which can include aminosilane and any accelerating agent if desired. Some solvent can be included with the curing agent. The other package contains the epoxy resin which may optionally include epoxysilane, solvent and fillers. Both containers should be moisture-proof.

The IPN of the present invention can be applied as a coating having a thickness ranging from 0.005" up to about 0.02" in thickness. Generally, the thicker the coating, the more resistant it is to attack by chemicals, solvents, heat, and weather. If necessary, multiple layers can be applied to the surface to be protected. The preferred dry film thickness is from about 0.003" to about 0.01" for convenient drying and curing properties.

The isolated reactions of IPN formation are as follows:

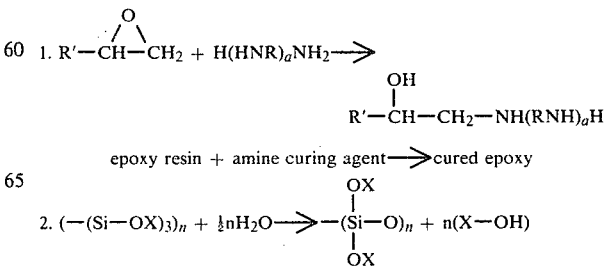

-continued silane + water → polysiloxane + alcohol

Reactions 1 and 2 occur essentially simultaneously. In reaction 1, an epoxy resin is cured with an amine curing agent to form cured epoxy polymer. The epoxy resins are selected from the group defined above, and the general formula for the amine curing agent is also defined above. Where epoxysilane is optionally utilized, the oxirane moiety of the epoxysilane also undergoes epoxy-amine addition of reaction 1. In reaction 2, silane groups undergo hydrolytic polycondensation to form a polysiloxane and an alcohol. The permissible groups from which the silane may be selected are set out above. Additionally, aminosilane and epoxysilane may substitute for some or all of the silane. The general formulas are defined for both aminosilane and epoxysilane above.

The hydrolysis of the silane requires water substantially uniformly distributed throughout the mixture of reactants in reactions 1 and 2 to obtain the IPN of this invention. The chemical and physical properties of the final IPN are affected by the relative rates of reactions 1 and 2. Reaction 2 depends directly on the water content of the mixture. Since absorption from the environment is slow relative to reaction 1, formation of the organic epoxy polymer would predominate over formation of the inorganic polysiloxane, if only water absorbed from the atmosphere were available. Accordingly, the mixture used to form the IPN of this invention includes an agent which ensures an adequate supply of water distributed substantially uniformly throughout the mixture. For example, a water-miscible solvent compatible with the other components may provide the water needed for reaction 2. The alcohols, aldehydes, amines, ethers, and ketones having less than about nine carbon atoms are good agents for distributing water throughout the mixture.

A preferred method for ensuring sufficient water being substantially uniformly distributed throughout the reaction mixture uses a ketone solvent. Preferably, the epoxy resins are dissolved in a ketone selected from the group consisting of acetone, methyl ethyl ketone, methyl propyl ketone, diethyl ketone, 2-hexanone, and 3-hexanone. Ketones react reversibly with primary amines as follows:

$$R'_2C\!=\!O + H(HNR)_aNH_2 \rightleftharpoons R'_2C\!=\!N(RNH)_aH + H_2O$$

ketone + amine curing agent → ketimine + water  (3)

In the presence of hydrolyzable silanes, the water formed in reaction 3 is rapidly and irreversibly reacted with some of the silane according to reaction 2. Although the secondary amine groups are not affected by the ketone and, therefore, remain free to react with oxirane groups, the ketimine formed in reaction 3 will not react with the oxirane groups of epoxy resins or of epoxysilanes and will remain in ketimine form until additional water is introduced to reverse reaction 3. This water can be added initially or can be absorbed from the environment. Since only primary amines react to form ketimines, any secondary amine groups present, either on the aminosilane or the amine curing agent, can react with the oxirane groups. However, without the availability of primary amines, the rate of epoxy-amine reaction is slowed overall and limited by moisture absorption from the environment so the unreacted oxirane and silane groups complete the polymerization at substantially balanced rates.

The water required for reversal of the ketimine formation, reaction 3, may be acquired relatively fast by absorption from the atmosphere if the mixture is applied as a thin coating by spraying. Spraying and the thin coating results in absorption of atmospheric moisture substantially uniformly distributed throughout the reaction mixture to release the primary amine from the ketimine to cause the epoxy and the silane groups to polymerize at balanced rates to produce a good IPN in which the epoxy network is substantially uniformly intertwined with the siloxane network.

Another method of ensuring adequate water for the hydrolytic polycondensation of the silanes is to use it in a solvent for the epoxy resins consisting of a ketone selected from the group above and an alcohol selected from the alcohols having less than about six carbon atoms. Examples of such alcohols are methanol, ethanol, propanol, isopropanol, n-butanol, isobutanol, sec-butanol, tert-butanol, amyl alcohol, and tert-amyl alcohol. Methyl, ethyl, and butyl Cellosolve may also be used. Cellosolve is Union Carbide's trademark for mono- and dialkyl ethers of ethylene glycol and their derivatives, widely used as industrial solvents. Methyl Cellosolve, for example, has the formula $H_3C\!-\!O\!-\!CH_2\!-\!CH_2\!-\!OH$. Preferably, the ratio of alcohol to ketone is at least about 1:1 by weight. The epoxy resin may also be dissolved in a mixture of xylene and alcohol, the alcohol being selected from the group set out above. Preferably, the ratio of alcohol to xylene is about 1:1 by weight. When alcohol is used with either xylene or a ketone as the epoxy resin solvent, sufficient water may be added to the solvent to ensure substantially uniform distribution of water throughout the reaction mixture. Therefore, judicious choice of solvents, or no solvent, affects the chemical and physical properties of the IPN.

The interpenetrating polymer networks of the present invention have substantial advantages over conventional epoxy polymers. Our IPN has better acid and solvent resistance than the corresponding unmodified epoxy polymer. The IPNs can be prepared as thin films at ambient temperature by any of the methods described herein. Coatings containing the IPNs of the present invention, because of high cross-link density obtained in the presence of the polysiloxane, exhibit superior thermal stability, greater chemical and solvent resistance, and higher acid resistance than coatings containing the corresponding epoxy polymer. Coatings containing the interpenetrating polymer network are resistant to attack by strong solvents, such as acetone, methanol, and low-molecular weight amines.

The coating formulations presented herein cure at ambient temperature, and provide corrosion, chemical, solvent, weathering, and heat resistance. Examples of surfaces on which these compositions can be used are steel structures of chemical processing plants, oil refineries, coal-fired power plants, and offshore drilling platforms. Additionally, internal surfaces of tanks of petroleum tankers carrying crude oil or refined oil products, such as fuel oil, lube oil, kerosene, gasoline, jet fuel, and the like, and internal surfaces of tanks used in transport varieties of both chemicals, can be coated with this invention.

These and other features of the present invention will become more apparent upon consideration of the following examples.

EXAMPLE 1

A conventional epoxy resin cured with an aliphatic amine was made by mixing 14 grams of DER 671 epoxy resin with the stoichiometric amount (0.4 grams) of diethylene triamine (DETA) to produce an epoxy resin stoichiometrically cured with the aliphatic amine. DER 671 epoxy resin is a solution of 25% methyl ethyl ketone and 75% of an epoxy resin, by weight. The epoxy resin has an epoxy equivalent weight of 450–550. The mixture was sprayed and allowed to cure under ambient conditions to form a coating having a thickness of about 0.01".

EXAMPLE 2

An IPN was made in accordance with this invention by mixing 14 grams of DER 671 with the stoichiometric amount (1.48 grams) of N-(2-aminoethyl)-3-aminopropyltrimethoxysilane The mixture was sprayed and cured under ambient conditions to a solid about 0.01" thick, and having the IPN characteristic of this invention.

The thermal stability of the coatings made in accordance with Examples 1 and 2 was determined using thermal gravimetric analysis in which the coatings were slowly heated from 100° C. to 500° C. under identical conditions. The results are presented in FIG. 2, which shows that the IPN prepared according to the present invention (Example 2) had higher thermal stability than the corresponding conventional epoxy polymer (Example 1).

EXAMPLE 3A

An IPN was made in accordance with this invention by mixing and spraying the following ingredients to form a coating having a thickness of about 0.01":

| Ingredient | Parts by Weight |
| --- | --- |
| DER 671 epoxy resin | 14.0 |
| N-(2-aminoethyl)-3-aminopropyl-trimethoxysilane | 1.48 |
| China clay (filler) | 10.0 |
| SR 191 silicone intermediate resin | 1.0 |
| Titanium dioxide | 2.0 |
| Bentone (0.5 grams of Bentone in 4.5 grams of xylol) | 5.0 |

SR 191 is General Electric Company's trademark for a silicone intermediate resin having a molecular weight between about 500 and about 600, and having 15% methoxy groups by weight. Bentone is National Lead's trademark for amine-treated montmorillonite clay. The Bentone material is added to improve the thixotropic property of the mixture while in liquid form.

Example 3A was cured at ambient temperature in a moisture-free environment provided by a dessicator. After curing for two days, the film hardness was that shown in FIG. 3.

EXAMPLE 3B

A coating was prepared exactly as described above with respect to Example 3A, except that it was cured with atmospheric exposure. After two days' cure, the film hardness of Example 3B was that shown in FIG. 3. As indicated in FIG. 3, the hardness of Example 3A was 37% less than that of Example 3B. The difference between Examples 3A and 3B may be due to the lack of complete cure of the oxirane and silane groups in the coating Example 3A. Apparently, the ketimine formed by the reaction between the amine curing agent and the ketone solvent in the mixture tied up enough of the primary amine groups to prevent a complete cure of the epoxy resin, thus resulting in a comparatively soft film. It is also probable that the ketimine reaction formed insufficient water for a complete cure of the silane groups. However, on exposure to atmospheric moisture, some water was absorbed by the incompletely cured coating, freeing the primary amine groups from the ketimine form, and supplying additional water needed for complete cure of the silane groups.

EXAMPLE 4A

An IPN was made in accordance with this invention by mixing and spraying the following ingredients to form a cured coating having a thickness of about 0.01":

| Ingredient | Parts by Weight |
| --- | --- |
| DER 671 epoxy resin | 14.0 |
| N-(2-aminoethyl)-3-aminopropyl-trimethoxysilane | 1.48 |
| China clay (filler) | 10.0 |
| SR 191 silicone intermediate resin | 1.0 |
| Titanium dioxide | 2.0 |
| Bentone (0.5 grams of Bentone in 4.5 grams of xylol) | 5.0 |
| Methyl ethyl ketone | 10.0 |

A film coating was formed by spraying the mixture of Example 4A, and permitting it to cure under ambient conditions to a final thickness of about 0.01". The film had good resistance to solvents, such as methanol and acetone.

EXAMPLE 4B

An IPN was made in accordance with this invention exactly as described above for Example 4A, except that the 10 grams of methyl ethyl ketone were replaced by 10 grams of ethanol. A coating was formed by spraying and curing under ambient conditions as described above. This coating also had good resistance to solvents, such as methanol and acetone.

EXAMPLE 4C

A coating was made as described above for Example 4A, except that sufficient water was added to the mixture so that the added water, plus the water released by the ketimine formed when the methyl ethyl ketone reacted with the amine curing agent, was equal to the stoichiometric amount of water required to hydrolyze all of the siloxane groups in the reaction mixture. The coating formed in accordance with this Example 4C cured slowly and did not have as good solvent resistance to methanol and acetone as the coatings made in accordance with Examples 4A and 4B.

FIG. 4 shows the hardness developed by the coatings made in accordance with Examples 4A, 4B, and 4C as a function of time. The coating of Example 4A cured the fastest, reaching its maximum hardness within about four days. The coating of Example 4B cured more slowly, reaching a plateau of lesser hardness than Example 4A within about three days, and thereafter showing slightly increased hardness by the seventh day. Example 4C cured the slowest of the three, having a hardness at the end of eight days substantially below that of Examples 4A and 4B.

A comparison of the curves shown in FIG. 4 show how solvents used in the mixture to prepare the IPNs of this invention affect the simultaneous reactions required to form the intertwined networks of epoxy and polysiloxane. Alcohols are known to catalyze the epoxy-amine cure reaction to a greater extent than does ketone alone. Consequently, if only the epoxy reaction were taking place, one would expect to see an increase in the cure rate in the alcohol-ketone system (Example 4B) as compared to the pure ketone solvent (Example 4A). However, because an IPN is being formed, the alcohol causes a slower cure rate than when it is omitted. This may be due to the fact that alcohol as a solvent does not react with the primary amine groups of the curing agent to produce ketimine and water. Therefore, while the epoxy reaction may be slightly catalyzed by the alcohol, the silane reaction rate is probably decreased because of less water being available from the ketimine reaction in Example 4B as compared to Example 4A.

The slow curing rate of Example 4C is probably due to the fact that the stoichiometric amount of water initially present rapidly hydrolyzes the siloxane groups at a rate greater than the reaction of the ketone-modified amine causes curing of the oxirane groups in the epoxy resin. Thus, early polycondensation of the silane groups may sterically hinder the amine-epoxy reaction, causing slow film cure at ambient temperature.

Following Examples 5A and 5B are preferred coating formulations for applying IPN's of this invention to internal surfaces of tanks of petroleum tankers. The formulations of Examples 5A and 5B have pigment volume concentrations of 38 and 36%, respectively.

EXAMPLE 5A

| Ingredient | Parts by weight |
|---|---|
| DER 671 | 14.0 |
| SR 191 silicone intermediate resin | 1.0 |
| China Clay | 12.0 |
| Titanium Dioxide | 2.0 |
| Bentone .5g + xylol 10g | 5.0 |
| A-1120 | 1.48 |

EXAMPLE 5B

| Ingredient | Parts by Weight |
|---|---|
| DER 671 | 14.0 |
| SR 191 silicone intermediate resin | 2.0 |
| Bentone .5g + xylol 10g | 5.0 |
| China Clay | 10.0 |
| Titanium dioxide | 2.0 |
| A-1120 | 1.48 |

DER 671, SR191, Bentone, and A-1120 are as defined above.

Although the present invention has been described with considerable detail with reference to certain preferred variations thereof, other variations are possible. Therefore, the spirit and scope of the appended claims should not be limited to the preferred versions described herein.

We claim:

1. A method for preparing an interpenetrating polymer network having an epoxy network intertwined with a polysiloxane network comprising the steps of:
   (a) mixing a silane with an epoxy resin having at least two oxirane groups per molecular, the silane being selected from the group consisting of aminosilane, epoxysilane, alkoxysilane, alkyltrialkoxysilane, aryltrialkoxysilane, and hydrolytic polycondensation products thereof;
   (b) distributing water substantially uniformly throughout the mixture in an amount sufficient to bring about substantial hydrolytic polycondensation of the silane to form a polysiloxane network; and
   (c) substantially simultaneously reacting the epoxy resin with an amine curing agent to form a polymerized epoxy resin network intertwined with the polysiloxane network.

2. The method of claim 1 in which the amine curing agent has the general formula:

where a is an integer from 1 to about 6, each R is a difunctional radical independently selected from the group consisting of alkyl, aryl, dialkylaryl, alkoxyalkyl, and cycloalkyl radicals, and R may vary within the amine curing agent.

3. The method of claim 1 in which the mixture includes a carbon-containing compound with less than about nine carbon atoms and which contains a linkage selected from the group consisting of oxygen-hydrogen, nitrogen-hydrogen, ether, and carbonyl.

4. The method of claim 1 wherein at least 0.1 equivalent weight of silane is present for each equivalent weight of epoxy resin.

5. The method of claim 2 in which R is —CH$_2$—CH$_2$—.

6. The method of claim 1 wherein the epoxy resin is cured with sufficient amine curing agent to provide from 0.5 to about 1.2 equivalent weight of amine for each equivalent weight of epoxy resin.

7. The method of claim 6 in which about one equivalent weight of amine is present for each epoxy resin equivalent weight.

8. The method of claim 1 wherein the silane is a trimethoxysilane.

9. The method of claim 1 wherein the epoxy-polysiloxane interpenetrating polymer network is formed in the presence of sufficient filler to avoid the formation of visible domains.

10. The method of claim 9 in which the pigment volume concentration of the filler is from about 20 to about 50%.

11. The method of claim 1 wherein the interpenetrating polymer network is prepared by spraying the mixture to form a coating having a thickness from about 0.005" to about 0.02".

12. The method of claim 1 wherein substantially uniform distribution of water throughout the mixture is obtained by spraying the mixture in the presence of atmospheric moisture.

13. The method of claim 1 wherein the epoxy resin is dissolved in a ketone solvent which reversibly reacts with the amine curing agent to form a ketimine and water for the hydrolytic polycondensation of the silane.

14. The method of claim 13 wherein the ketone solvent is selected from the group consisting of acetone, methyl ethyl ketone, methyl propyl ketone, diethyl ketone, 2-hexanone, and 3-hexanone.

15. The method of claim 13 which includes exposing the mixture to water in the atmosphere to hydrolyze the ketimine to ketone and amine curing agent.

16. The method of claim 1 wherein the epoxy resin is dissolved in a mixture of xylene and alcohol.

17. The method of claim 16 wherein the alcohol is selected from the group consisting of methanol, ethanol, propanol, isopropanol, n-butanol, isobutanol, sec-butanol, and tert-butanol.

18. The method of claim 16 wherein the ratio of alcohol to xylene is at least about 1:1 by weight.

19. The method of claim 1 wherein the epoxy resin is dissolved in a mixture of a ketone and alcohol.

20. The method of claim 19 wherein the ketone is selected from the group consisting of acetone, methyl ethyl ketone, methyl propyl ketone, diethyl ketone, 2-hexanone, and 3-hexanone.

21. The method of claim 18 wherein the alcohol is selected from the group consisting of methanol, ethanol, propanol, isopropanol, n-butanol, isobutanol, sec-butanol, and tert-butanol.

22. The method of claim 18 wherein the ratio of the alcohol to the ketone is at least about 1:1 by weight.

23. The method of claim 1 wherein the amine curing agent includes an aminosilane of the general formula:

$$Y-Si-[O-X]_3$$

where each X is independently selected from the group consisting of alkyl, hydroxyalkyl, alkoxyalkyl, and hydroxyalkoxyalkyl radicals containing less than six carbon atoms, and where Y is $H[HNR\!-\!]_a$, in which a is an integer from 2 to about 6, and each R is a difunctional radical independently selected from the group consisting of alkyl, aryl, dialkylaryl, alkoxyalkyl, and cycloalkyl radicals, and R may vary within a Y.

24. The method of claim 23 in which at least 0.1 silane equivalent weight is present for each epoxy resin equivalent weight.

25. The method of claim 23 wherein the epoxy resin is cured with a mixture of amine curing agent having the general formula of claim 2 and an aminosilane.

26. The method of claim 23 in which Y is $H[HN(CH_2)_b\!-\!]_a$, where a is an integer from 1 to about 10, and b is an integer from 1 to about 6, and b may vary within a given molecule.

27. The method of claim 23 wherein the epoxy resin is cured with sufficient amine of the general formula of claim 2 and of the general formula of claim 23 to provide from 0.5 to about 1.2 amine equivalent weights per epoxy resin equivalent weight.

28. The method of claim 27 wherein the ratio of the number of amine equivalent weights to the epoxy resin equivalent weights is about 1:1.

29. The method of claim 23 wherein the epoxypolysiloxane interpenetrating network is formed in the presence of sufficient filler to avoid the formation of visible domains.

30. The method of claim 29 in which the volume concentration of the filler is from about 20 to about 50%.

31. The method of claim 23 wherein the interpenetrating polymer network is prepared by spraying the mixture to form a coating having a thickness from about 0.005" to about 0.02".

32. The method of claim 23 wherein the substantially uniform distribution of water throughout the mixture is obtained by spraying the mixture, in the presence of atmospheric moisture.

33. The method of claim 23 wherein the epoxy resin is dissolved in a ketone solvent which reversibly reacts with amine to form a ketimine and the water for the hydrolytic polycondensation of the silane.

34. The method of claim 33 wherein the ketone solvent is selected from the group consisting of acetone, methyl ethyl ketone, methyl propyl ketone, diethyl ketone, 2-hexanone, or 3-hexanone.

35. The method of claim 33 wherein water is absorbed from the atmosphere to hydrolyze the ketimine to ketone and amine curing agent.

36. The method of claim 23 wherein the epoxy resin is dissolved in a mixture of xylene and alcohol.

37. The method of claim 36 wherein the alcohol is selected from the group consisting of methanol, ethanol, propanol, isopropanol, n-butanol, isobutanol, sec-butanol, or tert-butanol.

38. The method of claim 37 wherein the ratio of alcohol to xylene is at least 1:1 by weight.

39. The method of claim 23 wherein the epoxy resin is dissolved in a mixture of a ketone and alcohol.

40. The method of claim 39 wherein the ketone is selected from the group consisting of acetone, methyl ethyl ketone, methyl propyl ketone, diethyl ketone, 2-hexanone, and 3-hexanone.

41. The method of claim 39 wherein the alcohol is selected from the group consisting of methanol, ethanol, propanol, isopropanol, n-butanol, isobutanol, sec-butanol, and tert-butanol.

42. The method of claim 39 wherein the ratio of the alcohol to the ketone is at least 1:1 by weight.

43. The method of claim 1 where the silane is selected from the group consisting of aminosilanes and epoxysilanes, the aminosilanes having the general formula:

$$Y-Si-[O-X]_3$$

where each X is independently selected from the group consisting of alkyl, hydroxyalkyl, alkoxyalkyl, or hydroxyalkoxyalkyl radicals containing less than 6 carbon atoms, and where Y is $H[HNR\!-\!]_a$, where a is an integer from 2 to about 6, and each R is a difunctional radical independently selected from the group consisting of alkyl, aryl, dialkylaryl, alkoxyalkyl, and cycloalkyl radicals, and R may vary within a Y; and the epoxysilanes having the general formula:

$$Z-Si-[O-X]_3$$

where X is defined above, and where Z is an alkyl or oxyalkyl group containing from 2 to about 8 carbon atoms and at least one oxirane group.

44. The method of claim 43 wherein the ratio of total silane equivalents to oxirane equivalents is at least 1:1.

45. The method of claim 43 wherein the source of silane is a mixture of an aminosilane, an epoxysilane, and other silanes selected from the group consisting of alkoxysilanes, alkyltrialkoxysilanes, aryltrialkoxysilanes, and hydrolytic polycondensation products thereof.

46. The method of claim 43 wherein an epoxysilane is at least about 20 molar percent of the total epoxy resin used in the interpenetrating network.

47. The method of claim 43 wherein the epoxy resin is cured with sufficient amine of the general formula of claim 2 or of the general formula of claim 23 to provide from 0.5 to about 1.2 amine equivalent weights per one epoxy resin equivalent weight.

48. The method of claim 47 wherein the ratio of the number of amine equivalents weights to the epoxy resin equivalent weights is about 1:1.

49. The method of claim 43 wherein the epoxypolysiloxane interpenetrating network is formed in the presence of sufficient filler to avoid the formation of visible domains.

50. The method of claim 49 in which the filler volume concentration is from about 20 to about 50%.

51. The method of claim 43 wherein the interpenetrating polymer network is prepared by spraying the mixture to form a coating having a thickness from about 0.005" to about 0.02".

52. The method of claim 43 wherein the substantially uniform distribution of water throughout the mixture is obtained by spraying the mixture, thus allowing it to absorb atmospheric moisture.

53. The method of claim 43 wherein the epoxy resin is dissolved in a ketone solvent which reversibly reacts with the amine of the general formula of claim 2 or of claim 23 to form a ketimine and the water for the hydrolytic polycondensation of the silane.

54. The method of claim 53 wherein the ketone solvent is selected from the group consisting of acetone, methyl ethyl ketone, methyl propyl ketone, diethyl ketone, 2-hexanone, or 3-hexanone.

55. The method of claim 53 wherein water is absorbed from the atmosphere to hydrolyze the ketimine to ketone and amino curing agent.

56. The method of claim 43 wherein the epoxy resin is dissolved in a mixture of xylene and alcohol.

57. The method of claim 56 wherein the alcohol is selected from the group consisting of methanol, ethanol, propanol, isopropanol, n-butanol, isobutanol, sec-butanol, or tert-butanol.

58. The method of claim 56 wherein the ratio of alcohol to xylene is at least 1:1 by weight.

59. The method of claim 43 wherein the epoxy resin is dissolved in a mixture of a ketone and alcohol.

60. The method of claim 59 wherein the ketone is selected from the group consisting of acetone, methyl ethyl ketone, methyl propyl ketone, diethyl ketone, 2-hexanone, and 3-hexanone.

61. The method of claim 59 wherein the alcohol is selected from the group consisting of methanol, ethanol, propanol, isopropanol, n-butanol, isobutanol, sec-butanol, and tert-butanol.

62. The method of claim 59 wherein the ratio of the alcohol to the ketone is at least 1:1 by weight.

63. An interpenetrating polymer network prepared by the method defined in any of claims 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60.

* * * * *